US007149536B2

(12) United States Patent
Lee

(10) Patent No.: US 7,149,536 B2
(45) Date of Patent: Dec. 12, 2006

(54) PERFORMING TERMINAL AUTHENTICATION AND CALL PROCESSING IN PRIVATE WIRELESS HIGH-SPEED DATA SYSTEM

(75) Inventor: Jun-Hyuk Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 57 days.

(21) Appl. No.: 10/826,320

(22) Filed: Apr. 19, 2004

(65) Prior Publication Data

US 2004/0219934 A1   Nov. 4, 2004

(30) Foreign Application Priority Data

Apr. 29, 2003  (KR)  ...................... 10-2003-0027343

(51) Int. Cl.
*H04Q 7/20* (2006.01)
(52) U.S. Cl. ................................. 455/462; 455/554.1
(58) Field of Classification Search ................ 455/425, 455/426.1, 435.1, 422.1, 462, 554.1, 550.1; 709/228, 243; 370/395.3, 352, 338, 348, 370/394; 713/168
See application file for complete search history.

(56) References Cited

U.S. PATENT DOCUMENTS

| 6,539,237 | B1 | 3/2003 | Sayers et al. |
| 6,687,243 | B1 | 2/2004 | Sayers et al. |
| 6,697,621 | B1 | 2/2004 | Taha et al. |
| 6,704,569 | B1 | 3/2004 | Larson |
| 2003/0008649 | A1 | 1/2003 | Larson |
| 2003/0069013 | A1 | 4/2003 | Lee et al. |

(Continued)

FOREIGN PATENT DOCUMENTS

JP    05-219053    8/1993

(Continued)

OTHER PUBLICATIONS

*Office action* from the Australian Patent Office issued in Applicant's corresponding Australian Patent Application No. 2004201346 dated Jul. 25, 2005.

(Continued)

*Primary Examiner*—Duc Nguyen
*Assistant Examiner*—Michael Vu
(74) *Attorney, Agent, or Firm*—Robert E. Bushnell, Esq.

(57) ABSTRACT

Terminal authentication and call processing in a private wireless high-speed data system is effected by a private pDLR adapted to effect authentication of a terminal entering the private network and call processing and arranged within a private EV-DO wireless network. Session information of the corresponding terminal is received from a data location register (DLR) of the public EV-DO network only when the terminal entering the private EV-DO wireless network requests the call connection for the first time and is stored in a database of the private pDLR, and the call processing and authentication are performed. The authentication of the corresponding terminal is performed by extracting an International Mobile Station Identity (IMSI) of the terminal included in the session information of the corresponding terminal and determining whether the extracted IMSI is registered in a pDLR database of the private EV-DO wireless network, without needing a separate AN_AAA in the private EV-DO wireless network. The call processing is then performed using the session information for the corresponding terminal stored in the private pDLR without a separate authentication procedure when a call connection is requested from the terminal entering the private network at least two or more times.

14 Claims, 4 Drawing Sheets

U.S. PATENT DOCUMENTS

| | | | |
|---|---|---|---|
| 2003/0078047 A1 | 4/2003 | Lee et al. | |
| 2003/0135626 A1* | 7/2003 | Ray et al. | 709/228 |
| 2003/0186694 A1* | 10/2003 | Sayers et al. | 455/426.1 |
| 2003/0223427 A1* | 12/2003 | Chang et al. | 370/395.3 |
| 2004/0010617 A1* | 1/2004 | Akahane et al. | 709/243 |
| 2004/0048601 A1 | 3/2004 | Lee et al. | |
| 2004/0048610 A1* | 3/2004 | Kim et al. | 455/422.1 |
| 2004/0172535 A1* | 9/2004 | Jakobsson et al. | 713/168 |
| 2004/0203771 A1* | 10/2004 | Chang et al. | 455/435.1 |
| 2004/0218587 A1 | 11/2004 | Kim et al. | |
| 2004/0219913 A1 | 11/2004 | Lee | |
| 2005/0059390 A1* | 3/2005 | Sayers et al. | 455/425 |
| 2005/0088999 A1* | 4/2005 | Waylett et al. | 370/338 |
| 2005/0207395 A1* | 9/2005 | Mohammed | 370/352 |

FOREIGN PATENT DOCUMENTS

| | | |
|---|---|---|
| JP | 07-023463 | 1/1995 |
| JP | 08-214358 | 8/1996 |
| JP | 10-098774 | 4/1998 |
| JP | 11-252612 | 9/1999 |
| JP | 2003-111124 | 4/2003 |

OTHER PUBLICATIONS

Japanese Office Action of the Japanese Patent Application No. 2004-131759, mailed on Jun. 20, 2006.

* cited by examiner

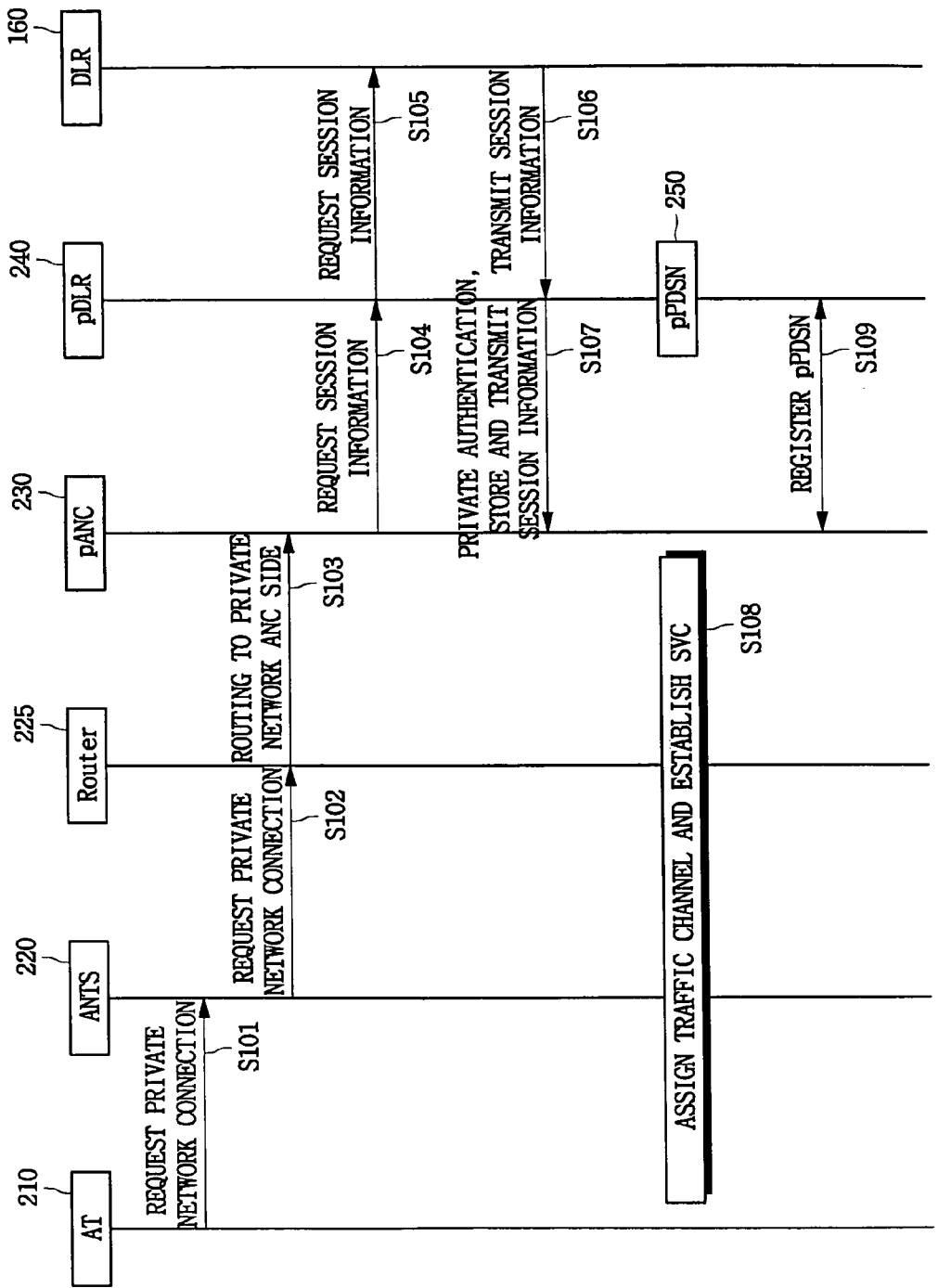

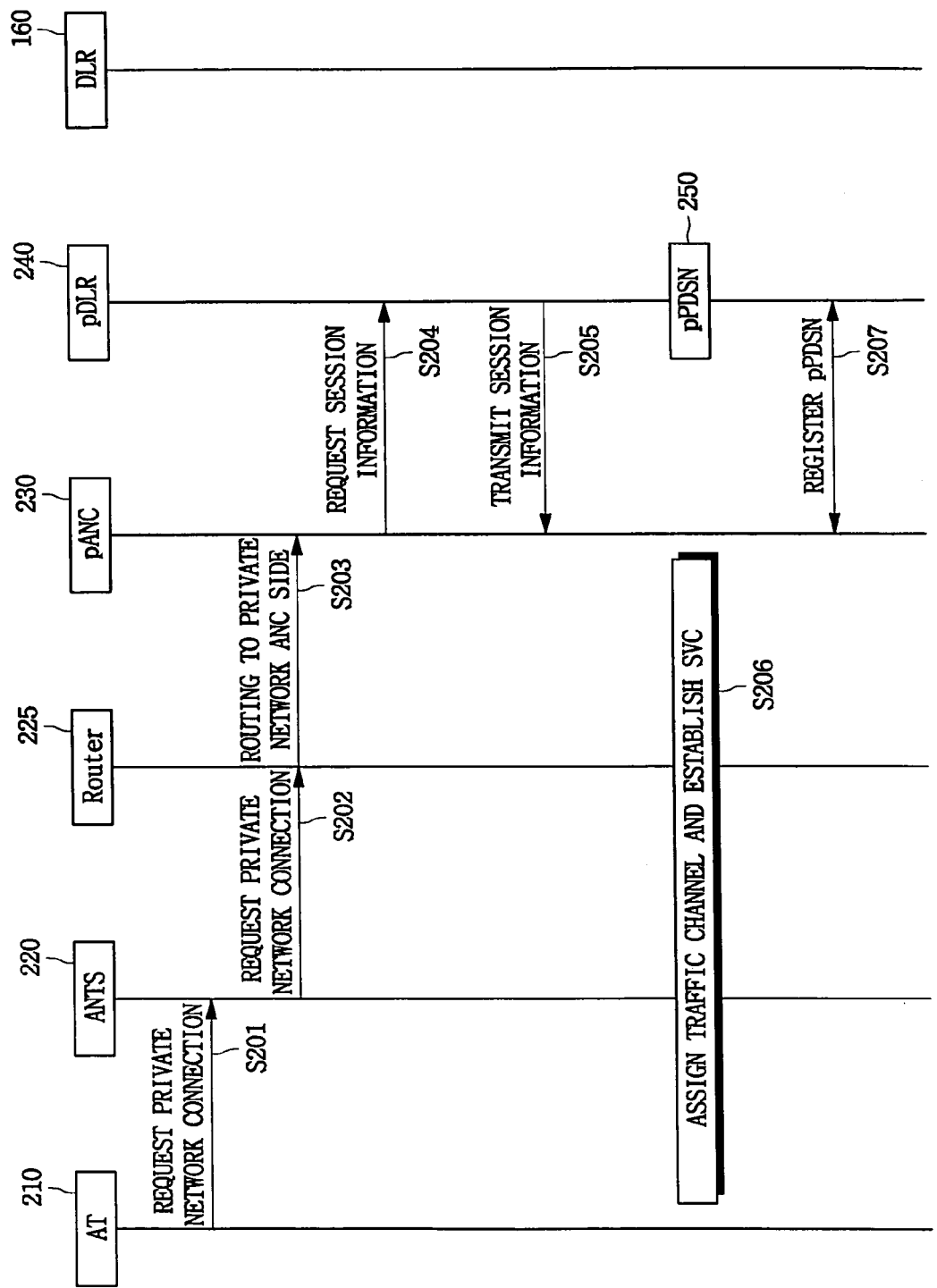

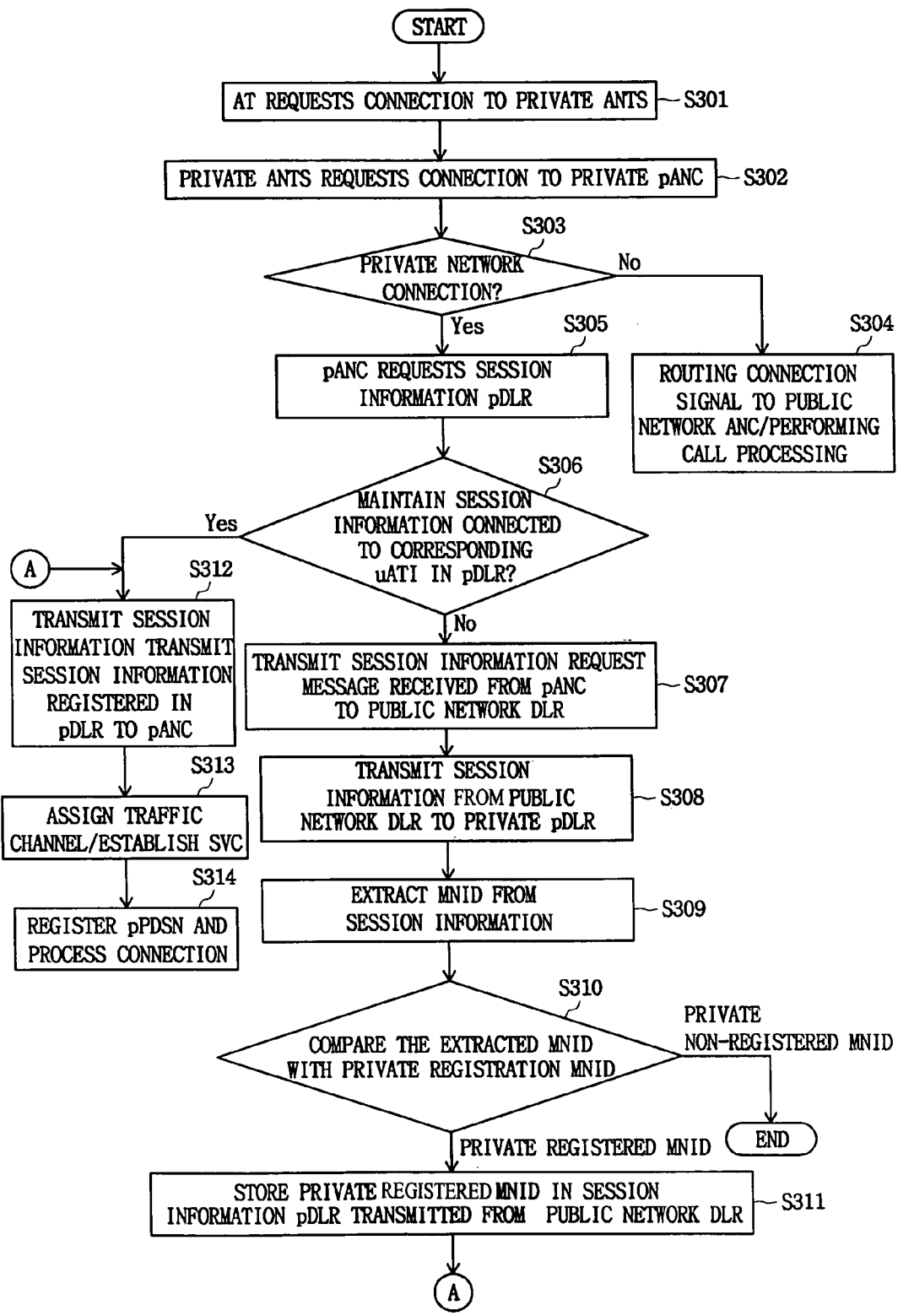

PERFORMING TERMINAL AUTHENTICATION AND CALL PROCESSING IN PRIVATE WIRELESS HIGH-SPEED DATA SYSTEM

CLAIM OF PRIORITY AND CROSS-REFERENCE TO RELATED APPLICATIONS

This application makes reference to, incorporates the same herein, and claims all benefits accruing under 35 U.S.C. §119 from an application for APPARATUS AND METHOD FOR PERFORMING TERMINAL AUTHENTICATION AND CALL PROCESSING IN PRIVATE WIRELESS HIGH-SPEED DATA SYSTEM earlier filed in the Korean Intellectual Property Office on 29 Apr. 2003 and there duly assigned Ser. No. 2003-27343.

Furthermore, the present application is related to two co-pending U.S. applications, Ser. No. 10/826,413, entitled PRIVATE WIRELESS HIGH-SPEED DATA SYSTEM AND DATA SERVICE METHOD, based upon Korean Patent Application Ser. No. 2003-27335 filed in the Korean Intellectual Property Office on 29 Apr. 2003, and filed in the U.S. Patent & Trademark Office concurrently with the present application, and Ser. No. 10/826,370, entitled PRIVATE EV-DO SYSTEM SHARING PUBLIC NETWORK DATA LOCATION REGISTER AND DATA SERVICE METHOD, based upon Korean Patent Application Ser. No. 2003-27342 filed in the Korean Intellectual Property Office on 29 Apr. 2003, and filed in the U.S. Patent & Trademark Office concurrently with the present application.

BACKGROUND OF THE INVENTION

1. Field of the Invention

The present invention is related to performing terminal authentication and call processing in a private wireless high-speed data system. More particularly, the present invention is related to performing terminal authentication and call processing in a private wireless high-speed data system wherein, when a call is connected between a wireless terminal of a wireless high-speed data system (CDMA 1x EV-DO) scheme and a private (premises) EV-DO wireless network. Private EV-DO wireless network authentication and private connection call processing of a terminal are performed using session information of the corresponding terminal registered in the public EV-DO wireless network.

2. Description of the Related Art

Generally, a CDMA 1x EV-DO (hereinafter, referred to as EV-DO) wireless network is a new packet wireless data transmission technology developed using CDMA technology by Qualcomm, which allows mega class high-speed data transmission. The EV-DO wireless network has a maximum transmission speed of 2.4 Mbps in a forward direction and 307.2 Kbps in a backward direction, which is the same transmission speed as that of an asymmetric digital subscriber line (ADSL) scheme used in a wired network.

EV-DO is being developed because the 1x RTT system of an IMT-2000 MC (Multi-Carrier; synchronous), which supports both voice and data and has been tested for commercial use, has a high-speed data transmission limit of 1.25 MHz bandwidth and does not support data transmission of 144 Kbps or more in an IS-95 scheme. That is, EV-DO is a supplementary solution for high-speed data transmission.

EV-DO provides a connection to the data dedicated Internet over a data core network (DCN) in an existing IS-95 network. It can support the same data transmission speed as an existing network, even in the third generation (3G) network.

EV-DO has an average forward transmission speed allowing high-speed data communication of several hundred kbps. Notwithstanding, the radio frequency bandwidth used is 1.25 MHz, which is the same as a mobile phone used in a current CDMA One. Considering that a bandwidth of 5 MHz is required to provide 384 bps service in IMT-2000, EV-DO has an improved high frequency usage efficiency.

That is, EV-DO has been designed in a manner suitable for data communication that is not affected by delay when transfer data is burst data as in the Internet, realizing the high-speed transmission with a frequency bandwidth narrower than that of IMT-2000.

Further, EV-DO performs a function of automatically adjusting backward transmission speed at a base station side according to communication quality between a terminal and a base station. This function is realized by monitoring a signal from the terminal received at the base station every 1.67 milliseconds to determine the communication quality and by adjusting data transmission priority and speed with the terminal.

EV-DO improves data communication quality by preferentially increasing transmission speed for a terminal in the vicinity of the base station where electrical wave interference is less while by reducing communication speed for a terminal located far from the base station.

A typical wireless network is classified into a wireless public network and a wireless private network, which is used at groups, companies, or the like having a particular purpose. The wireless private network is configured to interface with a particular wireless public network. On the other hand, in the above-described EV-DO wireless network, only public EV-DO wireless network service provided by a mobile communication service provider exists and there is no private EV-DO wireless network service, unlike the typical wireless network.

Thus, methods are being developed which use a part of a public EV-DO wireless network as a private EV-DO wireless network. These methods allow one mobile terminal to be served by the private EV-DO wireless network in a particular region (private region) while being served by the public EV-DO wireless network in other regions.

One of these methods was proposed in Korean Patent Application No. 10-2002-0054625, filed on Sep. 10, 2002 by the present Applicant and entitled "Method and System for Using in Common a Public Network and a Private Network in a Wireless High-speed Data System".

The proposed "Method and System for Using in Common a Public Network and a Private Network in a Wireless High-speed Data System" will be simply discussed. Among methods for implementing a private EV-DO wireless network (private network) in an EV-DO network, the following methods have been suggested therein in configuring a data location register (DLR) and AN_AAA needed for the EV-DO configuration.

First, in the case of the DLR, there is a scheme of handling a private network connection by allowing a direct connection to the public network DLR in order to configure the private network or by disposing a private dedicated DLR in the private network. Further, in the case of the AN_AAA, private authentication is handled by allowing a direct connection to the public network AN_AAA in order to handle private network connection authentication or by disposing a private dedicated AN_AAA in a private network, as in the DLR.

However, though such methods have their own merits, they have the following problems.

First, the method where a public network is shared without a separate private network DLR results in increasing the load on the public network DLR since the mobile communication service provider has to provide private network service. That is, since the terminal used in the private network uses the public network DLR in a private network connection and other steps using the private EV-DO wireless network even though it is registered in the public network, there is a problem in that the public network DLR usage time is increased because of the new service provision.

Since an initial DLR was designed without consideration of the private network service, a problem occurs in that the operation of the public DLR is greatly affected when the number of private EV-DO wireless networks is significantly increased.

In the second method of installing the private dedicated DLR which has the same function as the public network DLR in the private network, problems occur in that the private terminal cannot respond to a paging request of the public network, the private EV-DO wireless network cannot be connected to the public network, and public network and private network DLR loads are increased due to frequent subnet changes.

Also, in the third method of sharing the public network AN_AAA by installing the AN_AAA in the private network for the private network authentication and connecting to the public network AN_AAA through the private network AN_AAA, there is a problem in that a dedicated line is needed for connecting the public network AN_AAA to the private network AN_AAA and it is not easy to permit a selective private network connection.

Also, there is a method for managing a private network dedicated AN_AAA to effect private network authentication. However, a problem occurs in that server installation costs increases since a high performance dedicated AN_AAA server is needed, and the cost of operation for managing the server increases.

SUMMARY OF THE INVENTION

It is, therefore, an object of the present invention to provide an apparatus and method of performing terminal authentication and call processing in a private wireless high speed data system, wherein when there is the first call connection from a DLR arranged in a private network terminal and the private network DLR is coupled to a public network DLR using a dedicated line, session information for processing a call is secured from the public network DLR, the secured session information is stored in the private network DLR, and then the call processing is performed, and upon there being a further call connection from the private network terminal, the private network performs the call processing according to the session information stored in the private network DLR, so that unnecessary loading of the public network DLR can be eliminated.

Also, it is another object of the present invention to provide an apparatus and method of performing terminal authentication and call processing in a private wireless high speed data system, wherein the private network DLR extracts an IMSI (International Mobile Station Identity) of a terminal included in session information secured from a public network DLR and compares the extracted IMSI with an IMSI of a private registration terminal, without needing a separate AN_AAA for terminal authentication in the private network, so that the private registration terminal authentication can be performed.

According to an aspect of the present invention, a system is provided comprising: a private EV-DO wireless network coupled to a public EV-DO wireless network including a data location register adapted to provide private EV-DO wireless data service; a relay unit adapted to relay a corresponding call connection request signal upon the call connection request signal being received from a terminal entering the private EV-DO wireless network; a call processor adapted to generate a session information request signal with respect to the corresponding terminal upon the call connection request signal relayed from the relay unit being a first call connection request signal, and to perform call processing by assigning a traffic channel to the connection terminal according to the received session information upon the session information corresponding to the requested session information request signal being received; and a session information processor adapted to request the session information request signal of the corresponding terminal generated by the call processor from a public network data location register in the public EV-DO wireless network, to extract authentication information of the terminal included in the session information of the corresponding terminal received from the public network data location register, to store the received session information of the corresponding terminal in a database upon the extracted authentication information being authentication information of the terminal registered in the private EV-DO wireless network, and to provide the call processor with the corresponding session information.

Preferably, the authentication information includes an IMSI (International Mobile Station Identity).

Preferably, the session information processor is coupled to a data location register of the public EV-DO wireless network with a dedicated line.

Preferably, the session information processor provides the call processor with the session information of the corresponding terminal stored in the database upon the first call being connected to the session information processor without performing a separate terminal authentication process and without requesting the session information of the corresponding terminal from the public data location register of the public EV-DO wireless network, upon a connected call of the terminal received through the relay unit being a second or further connection call.

Preferably, the terminal includes a temporary identifier information generator adapted to add temporary identifier information to a call connection request signal transmitted to the relay unit upon a call being connected to the private EV-DO wireless network, the temporary identifier information being used to determine whether a corresponding call is a connection call to be connected to the public EV-DO wireless network or a connection call to be connected to the private EV-DO wireless network.

Preferably, the call processor includes a routing module adapted to determine whether the corresponding terminal connection call is a private EV-DO wireless network connection call or a public EV-DO wireless network connection call according to temporary identifier information included in the call connection request signal transmitted to the relay unit from the terminal, and to rout the corresponding call to one of the private EV-DO wireless network and the public EV-DO wireless network in accordance with a result of the determination.

Preferably, the system further comprises a data packet service node adapted to provide a corresponding terminal with data via an Intranet in the private EV-DO wireless network through the call processor upon a traffic channel to the corresponding terminal being assigned from the call processor and the call processing being performed.

According to another aspect of the present invention, a method is provided comprising: arranging a private EV-DO wireless network including a private base station, a private control station, and a private data location register, the private EV-DO wireless network being coupled to a public EV-DO wireless network including a public data location register; transmitting a call connection request signal of a corresponding terminal to the private control station by the private base station upon a call connection request being received in the private base station from a terminal entering the private EV-DO wireless network; requesting session information of the terminal for processing a call of the corresponding terminal to the private data location register by the private control station according to the call connection request signal transmitted from the private base station; determining in the private data location register whether the session information requested from the private control station is registered in a database and determining that the session information of the corresponding terminal is a private EV-DO wireless network connection call and requesting the session information of the corresponding terminal to a public data location register of the public EV-DO wireless network when the session information of the corresponding terminal is not registered and receiving the session information of the corresponding terminal from the public data location register; performing private authentication of the corresponding terminal in the private data location register using authentication information included in the session information of the received corresponding terminal and transmitting the session information of the corresponding terminal to the private control station and storing the corresponding session information in a database upon the corresponding terminal being determined to be a private registered terminal; and assigning a traffic channel of the corresponding terminal according to the session information of the terminal transmitted from the private data location register and performing data service through the assigned channel with the private control station.

Preferably, the terminal transmits the call connection request signal to the private control station and additionally transmits temporary identifier information used to determine whether the corresponding call is a public EV-DO wireless network connection call or a private EV-DO wireless network connection call upon a call connection request signal being transmitted to the private base station.

Preferably, requesting the session information of the terminal to the private data location register includes analyzing temporary identifier information included in the call connection request signal transmitted to the private base station from the terminal in the private control station and selectively routing a corresponding call connection request signal to a data location register of one of the public EV-DO wireless network and the private EV-DO wireless network.

Preferably, in receiving the session information of the corresponding terminal from the public data location register, upon the session information requested from the private control station being registered in the database, the private data location register determines that the call connection of the corresponding terminal is not the first call connection but is a second or further call connection and provides the control station with the session information of the terminal stored in the database without authentication of a separate terminal.

Preferably, the private information includes an IMSI (International Mobile Station Identity).

According to yet another aspect of the present invention, a method is provided comprising: arranging a private EV-DO wireless network system coupled to a public EV-DO wireless network system including a public data location register; determining whether a call connection of the corresponding terminal is a private EV-DO wireless network connection call or a public EV-DO wireless network connection call upon a call connection being requested from a terminal entering a private EV-DO wireless network; determining whether session information for the corresponding terminal exists in a database upon a determination that the corresponding call is a private EV-DO wireless network connection call; requesting the session information of the terminal for performing the private authentication and the call processing of the corresponding terminal to a public data location register located in the public EV-DO wireless network upon a determination that the session information for the corresponding terminal does not exist in the database; extracting IMSI (International Mobile Station Identity) information for authenticating a terminal included in the session information of the received corresponding terminal upon the session information of the corresponding terminal being received from the public data location register; determining whether the extracted IMSI information of the terminal is IMSI information of the terminal registered in the private EV-DO wireless network and performing private authentication of the corresponding terminal; and assigning a traffic channel of the corresponding terminal using the session information of the corresponding terminal and performing data service to the terminal through the assigned channel upon the authentication of the terminal being completed after storing the session information of the corresponding terminal in the database.

Preferably, determining whether the session information for the corresponding terminal exists in the database includes determining that the connection call of the corresponding terminal is a second or further connection call and assigning the traffic channel of the corresponding terminal using the session information of the corresponding terminal stored in the database without private authentication of a separate terminal upon the session information for the corresponding terminal existing in the database and performing data service to the terminal through the assigned channel.

The following patents each discloses features in common with the present invention but do not teach or suggest the inventive features specifically recited in the present application: U.S. Patent Application No. 2004/0048601 to Lee, entitled METHOD AND SYSTEM FOR USING EITHER PUBLIC OR PRIVATE NETWORKS IN 1xev-DO SYSTEM, published on Mar. 11, 2004; U.S. Patent Application No. 2003/0078047 to Lee et al., entitled APPARATUS, METHOD AND SYSTEM FOR MATCHING SUBSCRIBER STATES IN NETWORK IN WHICH PUBLIC LAND MOBILE NETWORK AND WIRED/WIRELESS PRIVATE NETWORK ARE INTER WORKED, published on Apr. 24, 2003; U.S. Patent Application No. 2003/0069013 to Lee et al., entitled APPARATUS, METHOD AND SYSTEM FOR MATCHING SUBSCRIBER STATES IN NETWORK IN WHICH PUBLIC LAND MOBILE NETWORK AND WIRED/WIRELESS PRIVATE NETWORK ARE INTER WORKED, published on Apr. 10, 2003; U.S. Pat. No. 6,704,569 to Larson, entitled CENTRALIZED USER DATABASE AND ADMINISTRATIVE NODE CONNECTING PRIVATE AND PUBLIC WIRE- LESS COMMUNICATIONS SYSTEMS, issued on Mar. 9, 2004; U.S. Pat. No. 6,697,621 to Taha et al., entitled METHOD AND APPARATUS FOR PROVIDING SERVICES IN A PRIVATE WIRELESS NETWORK, issued on Feb. 24, 2004; and U.S. Pat. No. 6,687,213 to Sayers et al., entitled METHOD AND APPARATUS FOR INTEGRATED WIRELESS COMMUNICATIONS IN PRIVATE AND PUBLIC NETWORK ENVIRONMENTS, issued on Feb. 3, 2004.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein:

FIG. 2 is a view showing a procedure of call processing between a private network and a public network when the call is first connected in the private network, in a method for performing terminal authentication and call processing in a private wireless high-speed data system in accordance with an embodiment of the present invention;

FIG. 3 is a view showing a procedure of call processing when the call is connected again in the private EV-DO wireless network 200 after the procedure shown in FIG. 2 (after the private EV-DO wireless network tries to connect first call); and FIG. 4 is a view showing an operational flowchart for a method of performing terminal authentication and call processing in a private wireless high-speed data system in accordance with an embodiment of the present invention.

DETAILED DESCRIPTION OF THE INVENTION

Figure 1:
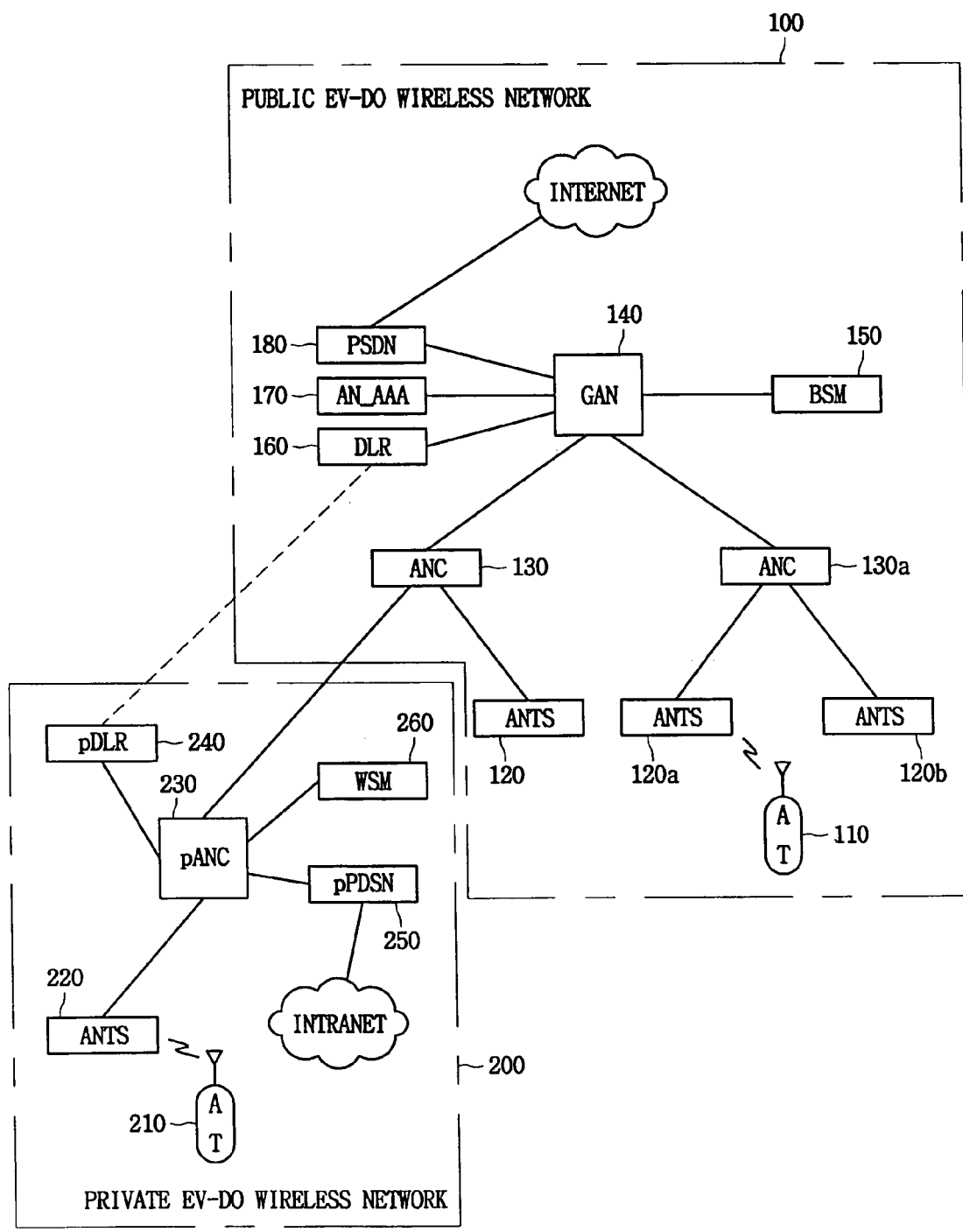
FIG. 1 is a view showing a network connection construction between a private wireless high-speed data system (private EV-DO wireless network) and a public wireless high-speed data system (public EV-DO wireless network) in accordance with an embodiment of the present invention.

Hereinafter, an embodiment of an apparatus for performing terminal authentication and call processing in a private wireless high-speed data system and a method thereof in accordance with an embodiment of the present invention will be described with reference to the accompanying drawings.

FIG. 1 is a view showing a network connection construction between a private wireless high-speed data system (private EV-DO wireless network) and a public wireless high-speed data system (public EV-DO wireless network) in accordance with an embodiment of the present invention. The constructions of the public EV-DO wireless network 100 and the private EV-DO wireless network 200 will be separately described in order to explain the construction and operation of the present invention.

First, as shown in FIG. 1, a terminal (AT: Access Terminal, 110) of the public EV-DO wireless network 100 is a terminal which is commonly used in the public EV-DO wireless network 100 and the private EV-DO wireless network 200, and a terminal 210 of the private EV-DO wireless network 200 is commonly used in the private EV-DO wireless network 200 which is also registered in the public EV-DO wireless network 100.

Further, each of ANTSs (Access Network Transceiver System: 120, 120a, 120b: public network base station) in the public EV-DO wireless network 100 has desired public wireless areas, establishes a session when a terminal enters the areas, and performs a necessary operation when a necessary identifier (UATI: Unicast Access Terminal Identifier) is assigned to a corresponding AT 110. Also, the ANTSs 120, 120a, 120b enable a call to be received in the AT 110, or relay a call connection request signal to ANCs (Access Network Control: 130, 130a, 130b) when there is a call connection request from the AT 110.

Each of the ANCs 130 and 130a is connected to a GAN (Global Area Network, hub) 140, and the GAN is connected to AN_AAA (Access Network Authentication Accounting Authorization) 170 which takes charge of public network authentication, public network terminal authentication and so on, a PDSN (Packet Data Serving Node) 180 which provides the terminal with an Internet service, a DLR (Data Location Register) 160 which stores terminal information, terminal location information and so on, and a BSM (Base System Manager) 150 which takes charge of loading, failure, diagnosis, statistics and so on and performs a data relay between each of the nodes. Also, although the ANTSs 120, 120a, 120b of the public EV-DO wireless network 100 can be connected to the GAN 140, it is not shown in FIG. 1.

Though the PDSN 180 can be connected to other packet service nodes or to a pPDSN 250 of the private EV-DO wireless network 200 through an Internet, it is not shown in the drawing.

The DLR 160 stores information on terminals 110 and 210 registered in the public EV-DO wireless network 100 (for example, MN ID (IMSI) information) and location information, and provides information on the terminals 110 and 210 when a session of the corresponding terminal is updated. Also, the DLR 160 stores information on a terminal included in a general wireless public network. The terminal information of the general wireless public network can include at least one of terminal information, user information and service grade information.

On the other hand, the ANTS 220 in the private EV-DO wireless network 200 provides the AT 210 entering the private area with an incoming call, or relays a call connection signal to pANC (Private Access Network Control) 230 when a call connection is carried out from the terminal 210.

The pANC 230 can include a router module (hub) which determines whether an outgoing data call is an outgoing call to be connected to the public network or an outgoing call to be connected to the private network using an identifier included in a data call originated from the AT 210, routes it to the ANC 130 of the public EV-DO wireless network 100 when the data call is the public network connection outgoing call, and routes the outgoing call in order to process a call in the private network EV-DO wireless network 200 when the outgoing call is a private network connection outgoing call.

The router module has a specific server address which has been already determined. Such a server address is compared with information of a temporary identifier. When a call is requested to a temporary identifier terminal in which a temporary identifier address having a specific server is already determined, the call is detected as a call in the private EV-DO wireless network 200 and the corresponding call is routed to the pANC 230.

For example, a temporary identifier of the private EV-DO wireless network 200 subscriber is assigned so as to have an address of a server which has been already determined. In the case that the determined server address is a server of "samsung.co.kr" or a "Samsung.com" DML server, for example, the terminal 210 in the private EV-DO wireless network 200 can have an address of "111@samsung.co.kr".

As described above, if it is requested that the AT 210 in the private EV-OD wireless network 200 is to be connected to one of server addresses which have been determined already or a call is to be connected to a terminal having the server described above, for example, a terminal of "aaa@samsung.co.kr", the call is determined to be a call in the private EV-DO wireless network 200.

When any one of a server included in the temporary identifier of the AT 210 requiring a call, a server which is required to receive a call, and a temporary identifier server of a terminal which is required to receive a call is not an address determined already, the corresponding call is determined to be a connection call of a public EV-DO wireless network 100 and routed to the ANCs 130 and 130a of the public EV-DO wireless network 100.

The pANC 230 including such a router module stores information on a location of a private AT 210 and other authentication and provides necessary information for processing the call when a call is connected from the private EV-DO terminal AT 210, and is connected to a pDLR 240 which performs authentication of the private EV-DO terminal AT 210 using the stored terminal authentication information IMSI.

Further, the pANC 230 is connected to a pPDSN 250 in which the private EV-DO terminal AT 210 is provided with Internet service through an Intranet, and to a WSM 260 which takes charge of loading, failure, diagnosis and statistic of the private EV-DO wireless network 200. Network components of the private EV-DO wireless network 200 as described above are similar to those of the public EV-DO wireless network 100 in their properties and functions.

However, when the pDLR 240 of the private EV-DO wireless network 200 performs a few different functions from the public network DLR 160 in order to support a private network and, especially, the pDLR 240, being the private DLR, also performs the private terminal authentication function so that separate AN_AAA equipment is not used.

An operation of the private EV-DO wireless network system interlocked to the public EV-DO network system in accordance with an embodiment of the present invention constructed as noted above is described below in detail.

First, the private EV-DO wireless network 100 is constructed by adding the pANC 230 between the public network ANTS 120 and the public network ANC 130 and network elements necessary for the EV-DO service as shown in FIG. 1.

One of important functions of the pANC 230 is to discriminate and transmit all kinds of messages coming from the private ANTS 220 to the public EV-DO wireless network 100 and the private EV-DO wireless network 200. The router module in the pANC 230 takes charge of this function as described above.

For example, when the EV-DO wireless terminal AT 210 located in the private EV-DO wireless network 200 tries to have an access to the public EV-DO wireless network 100, the pANC 230 recognizes an identifier (discriminator) included in a message transmitted by the private ANTS 220, transmits the message to the public network ANC 130, and makes it possible to connect to the public EV-DO wireless network.

When the terminal AT 210 tries to connect to the private EV-DO wireless network 200, as in the public network, the pANC 230 confirms a discriminator included in a message transmitted from the private ANTS 220 and enables the pANC 230 to support the private EV-DO wireless network 200 service using a network element installed in the premises. For reference, a discriminator to discriminate between the private EV-DO wireless network 200 and the public EV-DO wireless network 100 is provided from the EV-DO wireless terminal AT 210.

The EV-DO wireless network 200 provides the private EV-DO wireless network 200 service while maintaining a session established in the public EV-DO wireless network 100 in the private EV-DO wireless network 200, which has the following advantages.

First, the terminal AT 210 in the private EV-DO wireless network 200 can respond to a public network paging and a load increase of the public network DLR can be prevented since processing due to a subnet change does not occur.

Also, since all of tasks related with an initial session establishment are performed outside the private EV-DO wireless network 200, it is possible to embody a function of the pDLR 240 being a private DLR with ease compared with the public network DLR 160.

On constructing the pDLR 240 in the private EV-DO wireless network 200, it is possible to embody the pDLR 240 being the private DLR using a less expensive server than that of the public network DLR 160, and it is possible to use the authentication result embodied in the public network instead of a separate private AN_AAA when authenticating the private terminal AT 210.

As a result, tasks related to the session establishment and cancellation which occur in the public EV-DO wireless network 100 are not generated in the private EV-DO wireless network 200, wherein information related to the session to process a call processing is needed in the pDLR 240 being the private DLR and the private pDLR 240 having a function different from that of the public network DLR 160 is applied in order to solve the call processing.

Since the private pDLR 240 does not have necessary data in its initial operation, the data can be arbitrarily inputted by a private EV-DO wireless network 100 manager. However, information in the public network DLR 160 should be used in the case of specific data. Even though the corresponding terminal AT 210 is located in the premises, the session of the AT 210 is generated by the public network DLR 160, and most information necessary for the call processing is also stored in the public network DLR 160.

Accordingly, the general private EV-DO wireless network 200 call processing is performed using the private pDLR 240, and in the case of the most necessary information, the private EV-DO call processing is performed using a method of obtaining necessary information from the public network DLR 160. As a result, in order that the private pDLR 240 requests and receives necessary data stored in the public network DLR 160, a dedicated line must be installed between the private pDLR 240 and the public network DLR 160.

When private terminal authentication is performed using the private EV-DO wireless network 200, there occurs a problem when the private EV-DO wireless network 200 service is provided by maintaining the session established in the public EV-DO wireless network 100. The problem is when the authentication task for the private terminal should be performed.

In the case of the AT 210 registered in the public network, there is no problem since when establishing the session of the terminal, an authentication task for the corresponding terminal is performed by the public network AN-AAA 170 after the procedure of the session establishment. However, since tasks of session establishment and cancellation are not performed in the private EV-DO wireless network 200 as described above, the task of authentication through the public AN-AAA 170 is not performed in the step of call processing when constructing the private EV-DO wireless network 200. That is, since the authentication through the public AN-AAA 170 is performed in a new session establishment after the initial session establishment and session cancellation, it is not possible to perform the authenticating step arbitrarily during the step of connecting to the network simply.

As a result, the private EV-DO wireless network 200 must perform the authentication for the corresponding terminal, that is, a task for determining whether the corresponding terminal is an EV-DO terminal permitted in the private EV-DO wireless network 200 when the corresponding terminal is connected to the private EV-DO wireless network 200 instead of the session establishment step.

In the private EV-DO wireless network 200, information related to the session is needed in the private pDLR 240 in order to process the call processing, and this information is obtained from the public network DLR 160 connected using the dedicated line, wherein the private terminal AT 210 authentication is performed in the private pDLR 240 when the public network DLR 160 passes the session information to the private pDLR 240.

The session information transmitted by the public network DLR 160 has various information. When a terminal not registered in the premises tries to connect to the private EV-DO wireless network 200 using information needed for the private authentication among the various information, authentication of the private terminal AT 210 is not permitted in the step of the call processing in order that a message of the next step is not transmitted.

That is, the authentication of the private AT 210 is performed in the private pDLR 240 when the public network DLR 160 transfers the session information to the private pDLR 240 using the pDLR 240. There is various information in the session information transmitted by the public network DLR 160, including MNID (or IMSI: International Mobile Station Identity) needed for the private authentication.

The IMSI is a value having almost the same meaning as MIN (Mobile Identification Number) of 3G. The IMSI value is a value of which the public network AN_AAA 170 informs the finally authenticated terminal while finishing the session establishment and performing the authentication. Since this value is already registered in the public network DLR 160, the IMSI value received from the public DLR 160 and the IMSI value of the private registered terminal stored in the private pDLR 240 in advance (a terminal which can be used in the premises) are compared in the private pDLR 240.

As a result of the comparison, the procedure of the call processing is normally performed when the IMSI value of the corresponding terminal is an IMSI value registered in the private EV-DO wireless network 200, and otherwise, the private terminal is authenticated by enabling the message of the next step not to be transmitted to the terminal.

In the method for processing the user authentication in the private wireless high-speed data system in accordance with an embodiment of the present invention, which corresponds to the operation described above, a method for performing call processing and terminal authentication in a private EV-DO wireless network 200 will be explained step by step with reference to the accompanying drawings.

FIG. 2 is a view showing a procedure of call processing between a private network and a public network when the call is first connected in the private network, in a method for performing terminal authentication and the call processing in a private wireless high-speed data system in accordance with an embodiment of the present invention, and FIG. 3 is a view showing a procedure of call processing when the call is connected again in the private EV-DO wireless network 200 after the procedure shown in FIG. 2 (after the private EV-DO wireless network tries to connect the first call).

First, as shown in FIG. 2, when a wireless terminal AT 210 entering the private EV-DO wireless network 200 requests the first call connection to the private EV-DO wireless network 200, the wireless terminal AT 210 transmits a request signal to request a private EV-DO wireless network 200 connection to the private ANTS 220 (S101).

The private ANTS 220 routes a private network connection request signal transmitted from the AT 210 to the private pANC 230 through a router 225 (S102, S103).

The private pNAC 230 provides the private pDLR 240 with a session information request signal used to request session information necessary for a private network connection according to the private network connection request signal of the AT 210 routed by the router 225 (S104). However, when the corresponding AT 210 requested the connection for the first time, the private pDLR 240 does not store the session information for the corresponding AT 210.

In the existing DLR call processing, when the session information for the corresponding terminal does not exist in the DLR, a message that the session information does not exist is transmitted to the public ANC 130, and a procedure to open a new session starts. However, since the private EV-DO wireless network 200 must provide the private EV-DO wireless network 200 service in the state of maintaining the public network session endowed to the AT 210 without canceling it, a correction of the call processing is needed.

Accordingly, when the session information for the corresponding terminal AT 210 is not stored in a database, the private pDLR 240 transmits a session information request message received from the pANC 230 to the public network DLR 160 as it is (S105).

The public network DLR 160 searches for session information of the corresponding terminal AT 210 which has requested the network connection stored in its database according to the session information request message transmitted from the private pDLR 240 and transmits the session information to the private pDLR 240 (S106).

The pDLR 240 receives the session information of the connection request terminal AT 210 received from the public network DLR 160 and performs authentication of the AT 210 using the IMSI information included in the received session information. After completing the authentication, the pDLR 240 stores the session information of the received AT 210 in its database, and provides the private pANC 230 with the corresponding session information (S107). That is, the pDLR 240 extracts the IMSI value from the session information before storing the session information of the AT 210 received from the public network DLR 160 in its database, and compares the extracted IMSI value with the IMSI values of the private registration terminals stored in advance. When the corresponding IMSI value is the IMSI of the private registration terminal, the session information received from the public network DLR 160 is stored in the database of the private pDLR 240, and the remaining call processing procedure is performed. However, when the same IMSI value does not exist in the pDLR 240, it is determined that the AT 210 was not registered in the private EV-DO wireless network 200, and the session information received from the public network DLR 160 is not stored in the database and the call processing procedure is stopped.

As a result, as to the private EV-DO wireless network 200 non-registered AT 210, the call processing is not performed from the initial connection.

As described above, when the IMSI value of the session information received from the public network DLR 160 is identical to an IMSI of the private registration Ats stored in the private pDLR 240, that is, when the corresponding AT 210 is a terminal registered in the private EV-DO wireless network 200, the private pANC 230 assigns a traffic channel to the corresponding terminal AT 210 using the session information of the connection request terminal AT 210 transmitted from the private pDLR 240 and performs a call connection with the terminal AT 210 through the assigned channel (S108).

When the call connection is performed through the assigned channel as described above, the private pANC 230 registers the corresponding terminal AT 210 in the private pPDSN 260 and performs data service through an Intranet (S109).

After the terminal AT 210 entering the private EV-DO wireless network 200 performs the first call connection as described above, when the call connection is again performed, the call processing procedure will be briefly explained with reference to FIG. 3.

First, when the wireless terminal AT 210 entering the private EV-DO wireless network 200 requests a reconnection to the private EV-DO wireless network 200, the wireless terminal AT 210 transmits a request signal to request the private EV-DO wireless network 200 connection to the private ANTS 220 (S201).

The private ANTS 220 routes the private network connection request signal transmitted from the AT 210 to the pANC 230 through the router 225 (S202, S203).

The private pANC 230 provides the session information request signal to request the session information necessary for the private network connection to the private pDLR 240 according to the private network connection request signal of the AT 210 routed through the router 225 (S204).

The pDLR 240 searches for the session information of the corresponding terminal AT 210 stored in the database according to the pANC 230 and transmits the searched session information to the pANC 230 (S205).

Accordingly, the pANC 230 assigns a traffic channel to the corresponding terminal AT 210 using the session information of the connection request terminal AT 210 transmitted from the private pDLR 240 and performs a call connection with the terminal AT 210 through the assigned channel (S206).

When the call connection is performed through the assigned channel as described above, the private pANC 230 registers the corresponding terminal AT 210 in the private pPDSN 260 and performs data service through an Intranet (S207).

As a result, when a call re-connection is performed to the terminal AT 210 entering the private EV-DO wireless network 200 after the first call connection, the call processing procedure is very similar to that of FIG. 2, except that the call processing is performed using the session information stored in the pDLR 240 in the private EV-DO wireless network 200 without requesting the session information to the public network DLR 160 since the session information of the corresponding terminal AT 210 is already stored in the private pDLR 240. At this time, since the authentication procedure of the corresponding AT 210 passed the authentication procedure when the first call is connected, separate authentication processing is not performed.

A method of performing terminal authentication and call processing in a private wireless high-speed data system including the call processing procedure shown in FIGS. 2 and 3 in accordance with an embodiment of the present invention will be explained with reference to FIG. 4.

FIG.4 is a view showing an operational flow chart for a method for performing terminal authentication and call processing in a private wireless high-speed data system in accordance with the present invention.

First, as shown in FIG. 4, when a wireless terminal AT entering the private EV-DO wireless network requests a call connection to the private EV-DO wireless network, the wireless terminal AT transmits a request signal to request the private EV-DO wireless network connection to the private ANTS (S301).

The private ANTS routes the private network connection request signal transmitted from the AT to the private pANC through a router (S302).

The private pANC determines whether a call connection signal connected through the ANTS is a call connection signal for the private EV-DO wireless network connection or a call connection signal for a public EV-DO wireless network connection (S303). A determination as to whether the connection call of the AT is a private EV-DO wireless network connection call or a public EV-DO wireless network connection call is made by an identifier UATI included in the call connection request signal transmitted from the AT.

As a result of the determination, when the call connection signal is a public EV-DO wireless network connection call, the public EV-DO wireless network processes the corresponding call by routing the corresponding call connection request signal to the public ANC (S304).

However, when the call connection request signal of the AT is a private EV-DO wireless network connection request signal, the private pANC provides the private pDLR with the session information request signal to request session information necessary for the private network connection according the private network connection request signal of the AT routed through the router (S305).

The private pDLR determines whether session information for a call connection request terminal AT requested from the extension pANC is stored (registered) in the database (S306).

As a result of the determination, when no session information of the corresponding AT requesting the connection exists in the database of the private DLR, it is determined that a connection to the private EV-DO wireless network is being tried for the first time, and the private pDLR requests the session information of the corresponding terminal to the public DLR of the public EV-DO wireless network (S307). That is, the private pDLR requests the session information of the corresponding AT to the public DLR since the private pDLR does not have the session information for the corresponding AT when the corresponding AT requests the connection for the first time.

Next, the public DLR searches for the session information of the corresponding AT which requested the network connection stored in its database according to the session information request message transmitted from the private pDLR and transmits the session information to the private pDLR (S308).

The pDLR receives the session information of the connection request terminal AT received from the public network DLR, and extracts terminal authentication information included in the received session information, that is, the IMSI information (S309).

Next, the pDLR compares the extracted IMSI information of the corresponding AT with the IMSI information of the private registration Ats registered in its database, and determines whether the corresponding IMSI information is registered in the database (S310).

As a result of the determination, when the IMSI of the connection AT is not an IMSI registered in the pDLR database, the call processing is stopped, and a message for the call processing stop is transmitted to the corresponding AT.

However, as a result of the determination, when the IMSI of the connection AT is an IMSI registered in the pDLR database, it is determined that the corresponding AT is an AT registered in the private EV-DO wireless network and the session information transmitted from the public network DLR is stored in the database of the pDLR (S311), and then the corresponding session information is transmitted to the private pANC (S312).

Accordingly, the private pANC assigns the traffic channel to the corresponding terminal AT using the session information of the connection request AT transmitted from the private pDLR, establishes the service, registers and connects in the pPDSN of the private EV-DO wireless network, and then performs the data service requested by the corresponding AT (S313, S314).

On the other hand, in the step S306, when the session information for the call connection request AT requested from the private pANC is stored in the database of the private pDLR, that is, when the corresponding terminal performs a call connection to the private EV-DO wireless network at least two or more times, the session information of the corresponding AT stored in the database of the private pDLR is transmitted to the private pANC (S312). Here, when the AT is initially connected to the private EV-DO wireless network, the session information for the corresponding AT is received from the public DLR and stored in the private pDLR. Therefore, when the call connection is performed afterward, the session information of the corresponding AT is not received from the public DLR and the private EV-DO wireless network itself performs the call processing using the session information of the corresponding AT stored in the private pDLR.

Accordingly, the private pANC assigns the traffic channel to the corresponding terminal AT using the session information of the connection request terminal AT transmitted from the private pDLR and performs the call processing necessary for the connection (S313, S314).

As a result, the method for performing terminal authentication and call processing in the private wireless high-speed data system in accordance with an embodiment of the present invention arranges the private pDLR to take charge of the authentication and call processing of the private network entrance terminal in the private EV-DO wireless network, receives the session information of the corresponding terminal from the public EV-DO network DLR only when the terminal entering the private EV-DO wireless network requests the first call connection, stores the session information in the database of the private pDLR, and performs the call processing and authentication.

The authentication of the corresponding terminal is performed by extracting the IMSI of the terminal included in the session information of the corresponding terminal and determining whether the extracted IMSI is registered in the pDLR database of the private EV-DO wireless network, without installing a separate AN_AAA in the private EV-DO wireless network.

When the call connection is requested from the terminal entering the private network at least two or more times, the call processing is performed using the session information for the corresponding terminal stored in the private pDLR without a separate authentication procedure.

An apparatus for performing terminal authentication and call processing in a private wireless high-speed data system in accordance with an embodiment of the present invention and a method thereof reduces unnecessary loading in a public network DLR side according to a private EV-DO wireless network construction since after session information needed for the call processing is secured from a public network DLR when the call is connected for the first time, the following call processing can be performed by a private network DLR.

Furthermore, since the minimum function of the private DLR, that is, a function related with session establishment and cancellation is performed in the public network DLR and the only remaining function is performed in the private DLR, it is possible to use low capacity hardware when the private DLR apparatus is constructed, thereby resulting in a saving in the cost of materials.

Also, since the private terminal authentication can be performed by enabling a DLR function and a terminal private authentication function to be supported simultaneously using only the private pDLR, without purchasing a separate AN_AAA server, the total cost of the private EV-DO wireless network system is reduced and an operational cost necessary for managing a separate server is eliminated.

What is claimed is:
1. A system, comprising:
a private EV-DO wireless network coupled to a public EV-DO wireless network including a public Data Location Register (DLR) adapted to provide private EV-DO wireless data service;
an Access Network Transceiver (ANT) adapted to relay a corresponding call connection request signal upon the call connection request signal being received from a terminal entering the private EV-DO wireless network;
a private Access Network Control (pANC) adapted to generate a session information request signal with respect to the corresponding terminal upon the call connection request signal relayed from the ANT being a first call connection request signal, and to process a call by assigning a traffic channel to the connection terminal according to the received session information upon the session information corresponding to the requested session information request signal being received; and
a private Data Location Register (pDLR) adapted to determine whether the session information requested from the pANC station is registered in a database, determine that the session information of the corresponding terminal is a private EV-DO wireless network connection call, request the session information for the corresponding terminal to a public DLR of the public EV-DO wireless network when the session information of the corresponding terminal is not registered and receive the session information of the corresponding terminal from the public DRL, extract International Mobile Station Identity (IMSI) from authentication information for the terminal included among the session information of the corresponding terminal received from the public DLR, perform private authentication of the corresponding terminal in the pDLR using authentication information from the session information of the corresponding terminal, transmit the session information for the corresponding terminal to the pANC, and store the session information for the corresponding terminal in a database upon the authentication information representing that the terminal is registered in the private EV-DO wireless network.

2. The system according to claim 1, wherein the authentication information includes an IMSI (International Mobile Station Identity).

3. The system according to claim 1, wherein the session information processor is coupled to a data location register of the public EV-DO wireless network with a dedicated line.

4. The system according to claim 1, wherein the pDLR provides the pANC with the session information of the corresponding terminal stored in the database upon the first call being connected to the pDLR without performing a separate terminal authentication process and without requesting the session information of the corresponding terminal from the public DLR of the public EV-DO wireless network, upon a connected call of the terminal received through the ANT being a second or further call connection.

5. The system according to claim 1, wherein the terminal includes a temporary identifier information generator adapted to add temporary identifier information to a call connection request signal transmitted to the ANT upon a call being connected to the private EV-DO wireless network, the temporary identifier information indicating whether a corresponding call is a call connection to be connected to the public EV-DO wireless network or a call connection to be connected to the private EV-DO wireless network.

6. The system according to claim 1, wherein the pANC includes a routing module adapted to make a determination whether the corresponding terminal call connection is a private EV-DO wireless network call connection or a public EV-DO wireless network call connection according to temporary identifier information included in the call connection request signal transmitted to the ANT from the terminal, and to rout the corresponding call to one of the private EV-DO wireless network and the public EV-DO wireless network in accordance with a result of the determination.

7. The system according to claim 1, further comprising a data packet service node adapted to provide a corresponding terminal with data via an Intranet in the private EV-DO wireless network through the pANC upon a traffic channel to the corresponding terminal being assigned from the pANC and the call being processed.

8. A method comprising:
arranging a private EV-DO wireless network including a private base station, a private control station, and a private data location register, the private EV-DO wireless network being coupled to a public EV-DO wireless network including a public data location register;
transmitting a call connection request signal of a corresponding terminal to the private control station by the private base station upon a call connection request being received in the private base station from a terminal entering the private EV-DO wireless network;
requesting session information of the terminal for processing a call of the corresponding terminal to the private data location register by the private control station according to the call connection request signal transmitted from the private base station;
determining in the private data location register whether the session information requested from the private control station is registered in a database and determining that the session information of the corresponding terminal is a private EV-DO wireless network connection call and requesting the session information of the corresponding terminal to a public data location register of the public EV-DO wireless network when the session information of the corresponding terminal is not registered and receiving the session information of the corresponding terminal from the public data location register;
performing private authentication of the corresponding terminal in the private data location register using authentication information included in the session information of the received corresponding terminal and transmitting the session information of the corresponding terminal to the private control station and storing the corresponding session information in a database upon the corresponding terminal being determined to be a private registered terminal; and
assigning a traffic channel of the corresponding terminal according to the session information of the terminal transmitted from the private data location register and performing data service through the assigned channel with the private control station.

9. The method according to claim 8, wherein the terminal transmits the call connection request signal to the private control station and additionally transmits temporary identifier information used to determine whether the corresponding call is a public EV-DO wireless network connection call or a private EV-DO wireless network connection call upon a call connection request signal being transmitted to the private base station.

10. The method according to claim 8, wherein requesting the session information of the terminal to the private data location register includes analyzing temporary identifier information included in the call connection request signal transmitted to the private base station from the terminal in the private control station and selectively routing a corresponding call connection request signal to a data location register of one of the public EV-DO wireless network and the private EV-DO wireless network.

11. The method according to claim 8, wherein, in receiving the session information of the corresponding terminal from the public data location register, upon the session information requested from the private control station being registered in the database, the private data location register determines that the call connection of the corresponding terminal is not the first call connection but is a second or further call connection and provides the control station with the session information of the terminal stored in the database without authentication of a separate terminal.

12. The method according to claim 8, wherein the private information includes an IMSI (International Mobile Station Identity).

13. A method comprising:
arranging a private EV-DO wireless network system coupled to a public EV-DO wireless network system including a public data location register;
determining whether a call connection of the corresponding terminal is a private EV-DO wireless network connection call or a public EV-DO wireless network connection call upon a call connection being requested from a terminal entering a private EV-DO wireless network;
determining whether session information for the corresponding terminal exists in a database upon a determination that the corresponding call is a private EV-DO wireless network connection call;

requesting the session information of the terminal for performing the private authentication and the call processing of the corresponding terminal to a public data location register located in the public EV-DO wireless network upon a determination that the session information for the corresponding terminal does not exist in the database;

extracting IMSI (International Mobile Station Identity) information for authenticating a terminal included in the session information of the received corresponding terminal upon the session information of the corresponding terminal being received from the public data location register;

determining whether the extracted IMSI information of the terminal is IMSI information of the terminal registered in the private EV-DO wireless network and performing private authentication of the corresponding terminal; and assigning a traffic channel of the corresponding terminal using the session information of the corresponding terminal and performing data service to the terminal through the assigned channel upon the authentication of the terminal being completed after storing the session information of the corresponding terminal in the database.

14. The method according to claim 13, wherein determining whether the session information for the corresponding terminal exists in the database includes determining that the connection call of the corresponding terminal is a second or further connection call and assigning the traffic channel of the corresponding terminal using the session information of the corresponding terminal stored in the database without private authentication of a separate terminal upon the session information for the corresponding terminal existing in the database and performing data service to the terminal through the assigned channel.

* * * * *